Nov. 3, 1931.  C. O. STROMBECK  1,829,769
BASKET HANDLE APPLYING MACHINE
Filed July 28, 1930  5 Sheets-Sheet 2

INVENTOR
Carl O. Strombeck
BY
Chappell Earl
ATTORNEYS

Nov. 3, 1931.  C. O. STROMBECK  1,829,769
BASKET HANDLE APPLYING MACHINE
Filed July 28, 1930  5 Sheets-Sheet 4

INVENTOR
Carl O. Strombeck
BY
ATTORNEYS

Nov. 3, 1931. C. O. STROMBECK 1,829,769
BASKET HANDLE APPLYING MACHINE
Filed July 28, 1930   5 Sheets-Sheet 5

INVENTOR
Carl O. Strombeck
BY
Chappell Earl
ATTORNEYS

Patented Nov. 3, 1931

1,829,769

UNITED STATES PATENT OFFICE

CARL O. STROMBECK, OF PLYMOUTH, INDIANA, ASSIGNOR TO EDGERTON MANUFACTURING COMPANY, OF PLYMOUTH, INDIANA

BASKET HANDLE APPLYING MACHINE

Application filed July 28, 1930. Serial No. 471,205.

The main object of this invention is to provide a machine for applying wire handles to baskets in a manner that prevents distortion or loosening of the handle when it is sprung to receive the cover.

A further object is to provide a machine having these advantages which is entirely automatic and of large capacity.

Objects pertaining to details and economies of construction and operation of my invention will definitely appear from the detailed description to follow. The invention is defined in the claims.

A structure which embodies the features of my invention is clearly illustrated in the accompanying drawings, in which:

Fig. 6 is a fragmentary plan view of the work table and movable anvil members.

Fig. 9 is a fragmentary section showing the actuating cam for the clincher.

Figure 1:
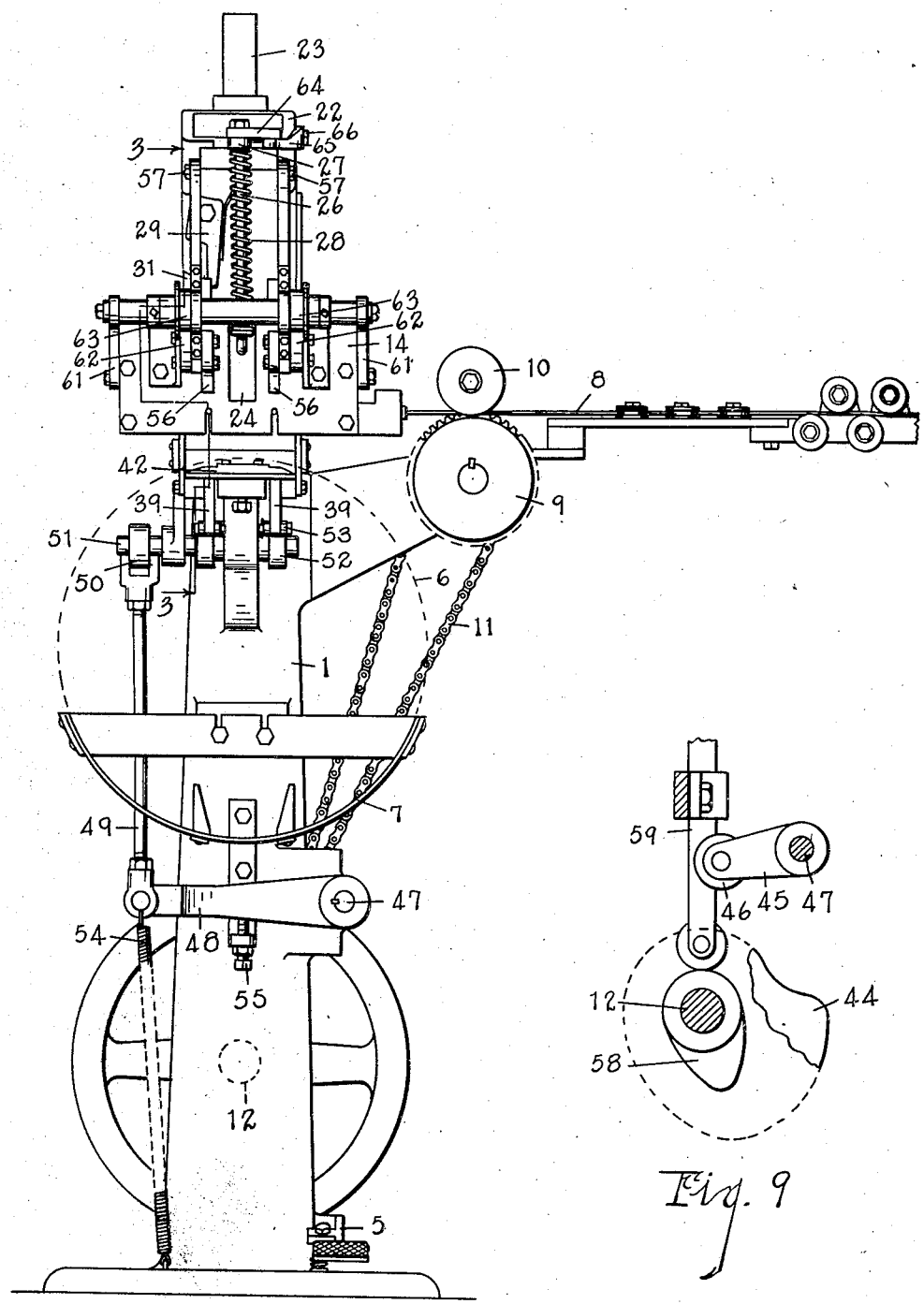
Fig. 1 is a front elevation of my improved handle applying machine.
Figure 2:
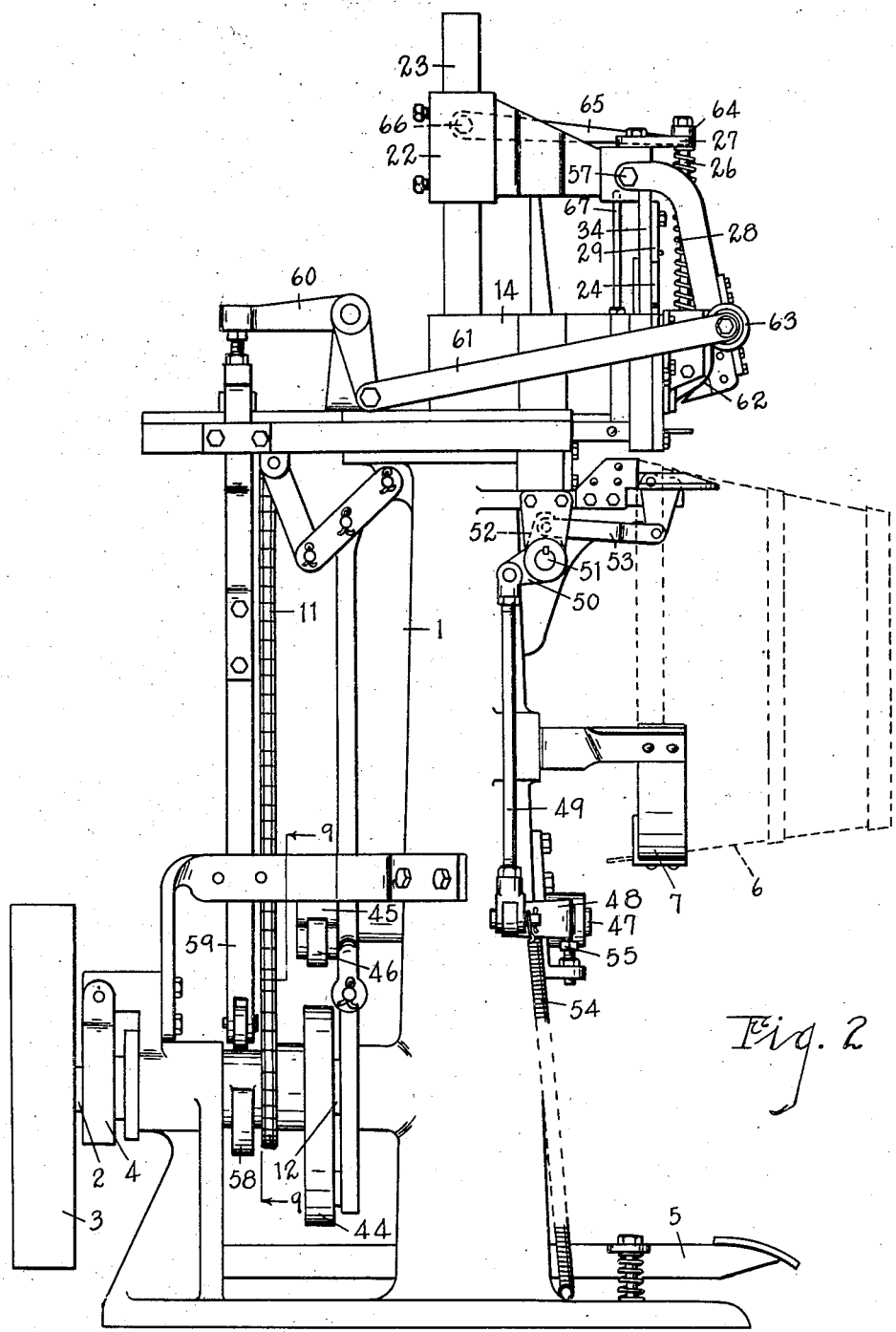
Fig. 2 is a side elevation looking from the left of Fig. 1, a basket being shown in the machine by dotted lines.

Referring to the drawings, the pedestal 1 is of suitable character to support the various parts. The driving shaft 2 is provided with a pulley 3 by means of which it is connected to a suitable source of power. A clutch is conventionally illustrated at 4 and is controlled by the foot lever 5. The details of these parts form no part of my present invention. A straight-side basket is represented at 6. The machine is provided with a segmental work rest 7.

The wire or handle stock 8 is fed into the machine by the feed rolls 9 and 10. The wire is drawn by the feed wheels through wire straightening rolls. These, however, form no part of my present invention.

The feed wheel 9 is driven from a sprocket chain 11 coacting with a sprocket on the cam shaft 12, which is connected to the shaft 2 through the clutch 4.

Figure 10:
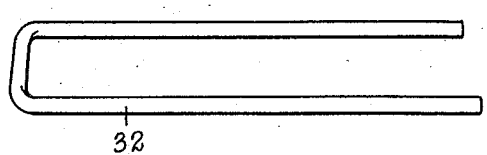
Fig. 10 is a perspective view showing the handle after the first forming operation thereon.

The wire is fed into initial forming position and cut, the cutter not being illustrated. The handle is first formed into a general U or staple shape as shown in Fig. 10 by bending around the forming block 13 which is yieldingly supported in the fixed head 14 by means of the coiled spring 15. The wire is fed into position relative to this forming block 13 and the reciprocating former 16 slidably mounted in the head member 14 engages the wire, bending it around the former block.

Figure 3:
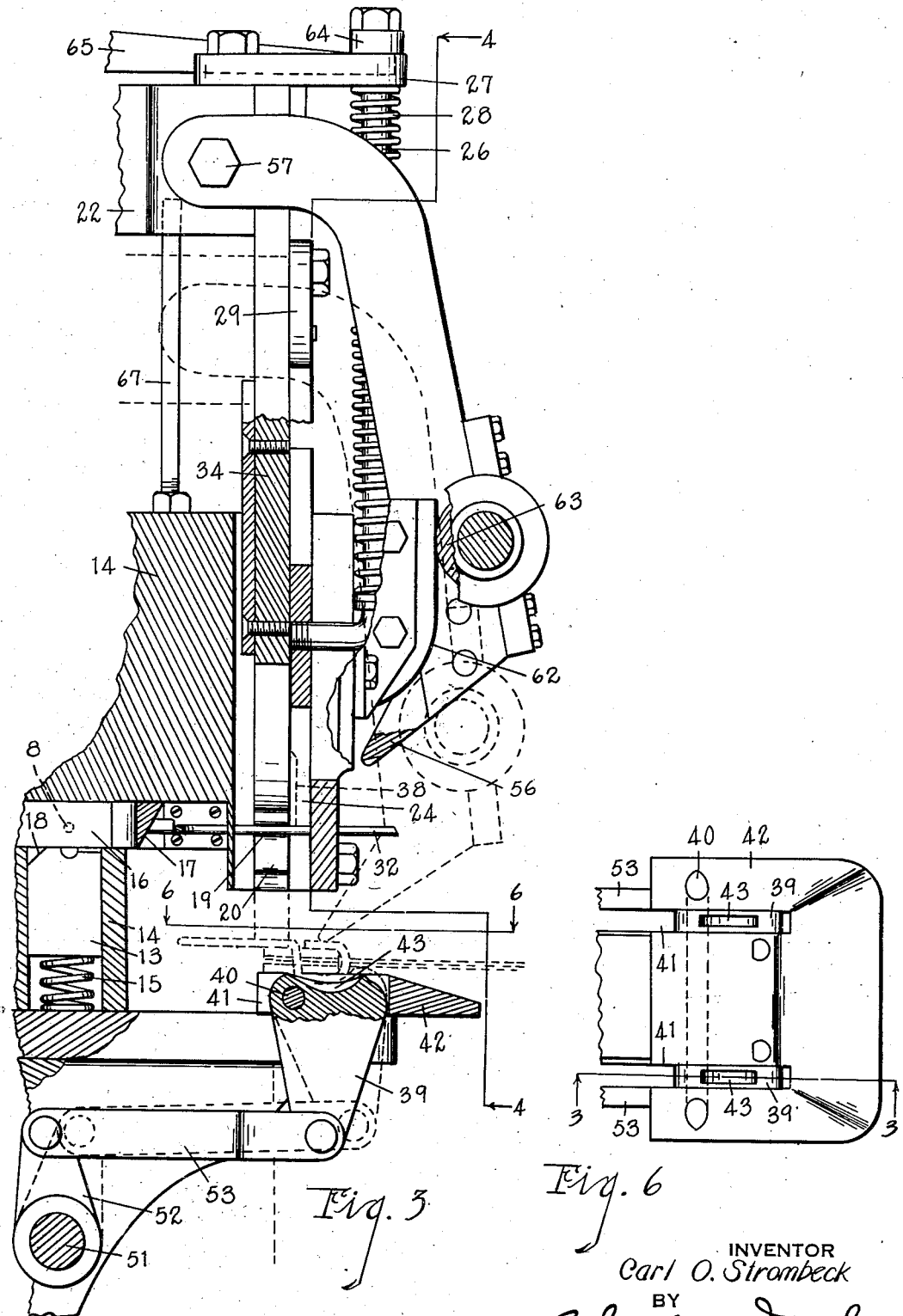
Fig. 3 is an enlarged fragmentary view partially in section on line 3—3 of Figs. 1 and 4.
Figure 4:
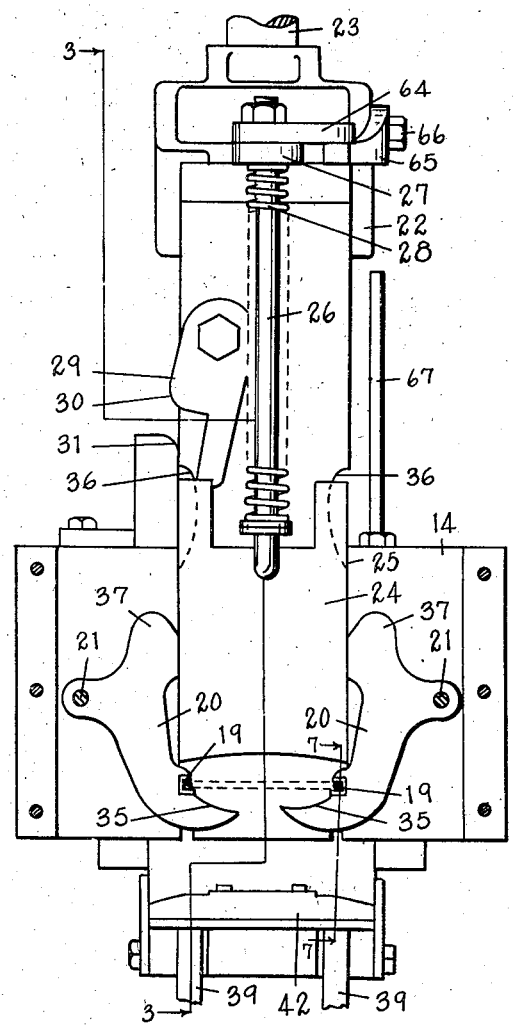
Fig. 4 is a fragmentary view partially in vertical section on a line corresponding to line 4—4 of Fig. 3 showing details of the handle forming mechanism, particularly the bending of the arms thereof prior to setting.
Figure 5:
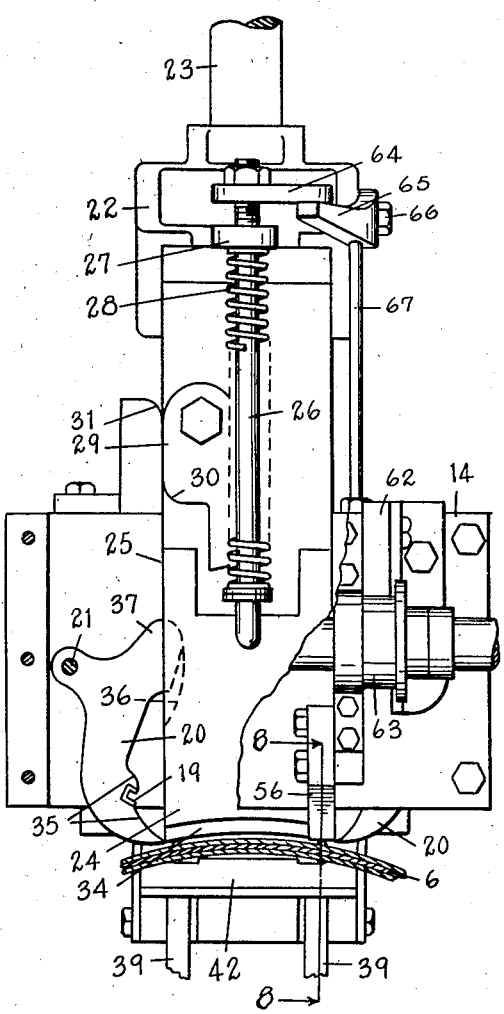
Fig. 5 is a similar view with the parts in another or fully actuated position.

Continued movement of the former 16 brings its inclined cam portion 17 into engagement with the cam portion 18 of the former block, pushing or forcing the former block down to the position shown in Fig. 3 and allowing the former 16 to carry the formed staple-shaped handle member forward to the position shown in Fig. 3 and into engagement with the recesses 19 in the pivoted holders 20 so that they may swing into the handle supporting position shown in Fig. 4, or from that position to the position shown in Fig 5 to permit the setting of the handle.

The reciprocating head 22 is mounted on the rod 23, which is reciprocated in timed relation to the movement of other parts, the actuating means not being illustrated. This reciprocating head carries the hammer or setting plunger 34, which is fixed to the head, and also a handle forming member 24 which moves with the hammer during a part of its stroke but has a slidable connection thereto so that the handle is completely formed prior to its engagement by the hammer.

The forming member 24 is slidably supported in ways 25 in the head member 14 and is provided with an upwardly projecting rod 26 which is slidable through a bracket 27 and supports a spring 28 acting to hold the former downwardly.

The hammer is provided with a dog 29 adapted to engage the former as shown in Fig. 4, carrying it down with the hammer during the forming stroke of the former. The dog, however, is released by its cam 30 being brought into engagement with the cam 31 on the head 14, thereby releasing the former and permitting the hammer to travel independently thereof.

Figure 11:
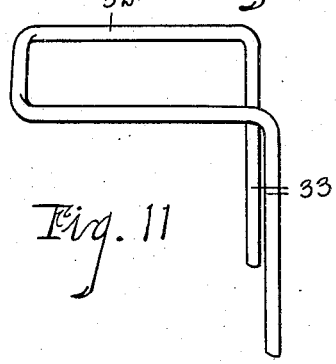
Fig. 11 is a perspective view of the handle showing its form after the second forming operation.
Figure 12:
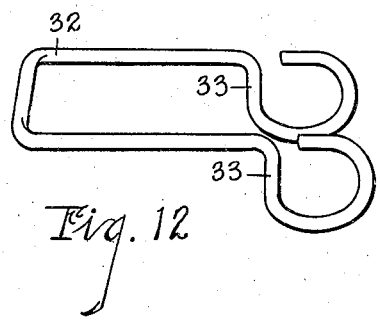
Fig. 12 is a perspective view of the handle in its completed or affixed form.
Figure 13:
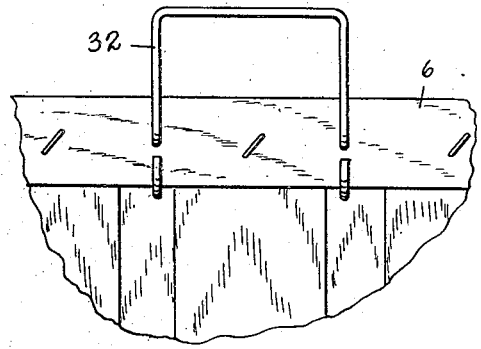
Fig. 13 is a fragmentary exterior view of the handle affixed to a basket.
Figure 7:
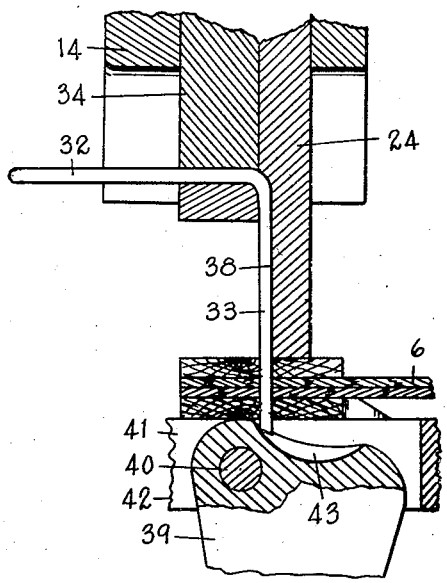
Fig. 7 is a fragmentary vertical section on line 7—7 of Fig. 4 showing further details of the handle forming mechanism and the relation thereof to the hammer or driving member, the work and the anvil.

The former 24 engages the handle, which has been previously bent into the staple form shown in Fig. 10 as described and designated generally by the numeral 32, bending the ends of its arms 33 while supported by the holders 20 substantially at right angles as shown in Fig. 11.

As the hammer travels down it engages the cam portions 35 of the holders, forcing them apart and releasing the handle from the holder notches 19. The hammer is provided with recesses shown by the dotted lines at 36, Fig. 5, into which the upper arms 37 of the holders swing, the bottoms of these recesses being, in effect, cams to return to holders to operative position on the return stroke of the hammer.

The forming member 24 has grooves 38 on its inner side which receive the wire, preventing its distortion or the arms thereof from being swung to one side as they are bent downwardly, and properly positioning them therein in relation to the anvils 39 which are pivoted at 40 in slots 41 in the work table 42, see Figs. 3, 6, 7 and 8.

The basket 6 is arranged on this table 42 within the support 7 and properly positioned to receive the prong ends 33 as they are forced by the hammer through the rim of the basket. The former 24 remains in supporting engagement with the handle during this operation.

Figure 8:
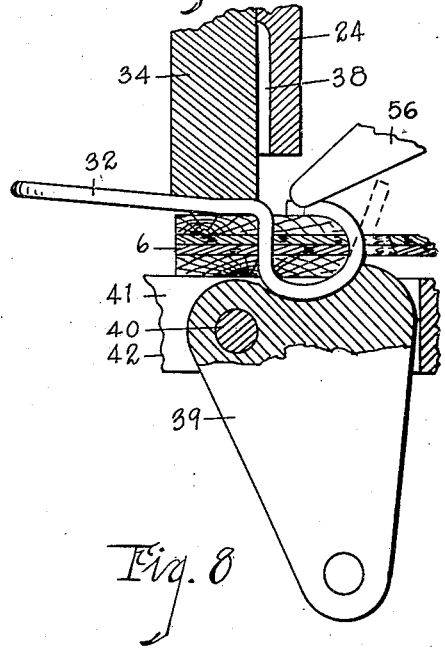
Fig. 8 is a similar sectional view showing the handle completely set and clinched, on line 8—8 of Fig. 5.

The anvils have curved grooves 43 in their faces and the handle prongs strike these grooves at the rear ends thereof, and, as they are forced downwardly by the hammer, the prongs are curved upwardly. After the curved form has been imparted to the ends of the prongs by engagement with the pivoted anvils, the anvils are actuated on their pivots to further direct the prongs and cause them to pierce the basket wall below the rim as shown in Fig. 8. The anvils serve the double purpose of guiding and forming the bends in the prongs and forcing them back through the wall of the basket.

The anvils are actuated from the cam 44 which coacts with an arm 45 provided with a roller 46, the arm being mounted on a rockshaft 47 which is provided with an arm 48 connected by the link 49 to the arm 50 of the bell crank lever pivoted at 51. The other arm 52 of this bell crank lever is connected by the link 53 to the anvil so that the anvils are actuated in properly timed relation to the other parts. A coiled spring 54 is connected to the base or pedestal and the arm 48 of the rockshaft 47 normally holds the arm 52 against an adjustable stop 55.

The final clinch is formed by the clinching members 56 which are pivoted at 57 on the reciprocating head 22. These members are actuated on their pivots in timed relation to the number of other parts so that, after the handle prongs are forced through the basket, roughly, to the position indicated by dotted lines in Fig. 8, they are clinched and set upon the rim as shown by full lines in Fig. 8.

This swinging movement is timed by the actuating cam 58 on the cam shaft 12 which coacts with a plunger rod 59 acting on one arm of the bell crank lever 60, the other arm of which is connected by the link 61 to the clinching members 56.

The clinching members are retracted on the up-stroke of the reciprocating head by means of cams 62 with which rollers 63 on the clinching members coact, so that on the return stroke of the reciprocating head the clinchers are swung outwardly out of the way of the other moving parts.

As the forming member 24 must be retracted to permit the actuation of the clinching members, I provide the rod 26 with an arm 64 which engages a pivoted lever 65 carried by the reciprocating head. This lever is pivoted at 66 to project into the path of a coacting stop 67 on the fixed head so that, as the reciprocating head moves downwardly, the lever 65 is brought into engagement therewith and actuated to retract the former to the position shown in Figs. 5 and 8. This permits the complete clinching operation by the clinching members.

The embodiment of my invention illustrated is entirely automatic, the handles being formed and set from wire stock drawn from coils or bales and the operator merely positioning the baskets to receive the handles.

I have not attempted to illustrate or describe certain modifications and adaptations which I contemplate as it is believed that this disclosure will enable those skilled in the art to which my invention relates to embody or adapt the same as may be desired.

Having thus described my invention, what I claim as new and desire to secure by Letters Patent, is:

1. The combination in a machine for making and applying handles including means for forming wire into a U-shaped handle unit, of a slotted work table, anvils having curved prong receiving grooves in their faces pivotally mounted in said slots, a reciprocating head, a hammer carried thereby, a prong forming member operatively associated with said hammer and head for limited movement independently of the hammer, means for actuating said forming member to form prongs on a previously formed handle unit and support them while acted upon by the hammer to drive them inwardly through the work and into engagement with said anvils, means for actuating said anvils on their pivots in timed relation to the actuation of said hammer and so that the prongs are bent and their ends directed outwardly through the work, clinching members pivotally mounted on said head, means for swinging said clincher members on their pivots in timed relation to the retracting of said prong forming member and the actuation of said anvils to clinch the ends of the prongs on the outside of the work and while supported by said anvils, and retracting cams with which said clincher members coact on the return stroke of the head to swing the clinching members outwardly.

2. The combination in a machine for making and applying handles including means for forming wire into a U-shaped handle unit, of a slotted work table, anvils having curved prong receiving grooves in their faces pivotally mounted in said slots, a reciprocating head, a hammer carried thereby, a prong forming member operatively associated with said hammer and head for limited movement independently of the hammer, means for actuating said forming member to form prongs on a previously formed handle unit and support them while acted upon by the hammer to drive them inwardly through the work and into engagement with said anvils, means for actuating said anvils on their pivots in timed relation to the actuation of said hammer and so that the prongs are bent and their ends directed outwardly through the work, clinching members pivotally mounted on said head, and means for swinging said clincher members on their pivots in timed relation to the retracting of said prong forming member and the actuation of said anvils to clinch the ends of the prongs on the outside of the work and while supported by said anvils.

3. The combination in a machine for making and applying handles including means for forming wire into a U-shaped handle unit, of a slotted work table, anvils having curved prong receiving grooves in their faces pivotally mounted in said slots, a reciprocating head, a hammer carried thereby, a prong forming means, means for actuating said anvils on their pivots in timed relation to the actuation of said hammer and so that the prongs are bent and their ends directed outwardly through the work, clinching members pivotally mounted on said head, means for swinging said clincher members on their pivots in timed relation to the actuation of said anvils to clinch the ends of the prongs on the outside of the work and while supported by said anvils, and retracting cams with which said clincher members coact on the return stroke of the head to swing the clinching members outwardly.

4. The combination in a machine for making and applying handles including means for forming wire into a U-shaped handle unit, of a slotted work table, anvils having curved prong receiving grooves in their faces pivotally mounted in said slots, a reciprocating head, a hammer carried thereby, a prong forming means, means for actuating said anvils on their pivots in timed relation to the actuation of said hammer and so that the prongs are bent and their ends directed outwardly through the work, clinching members pivotally mounted on said head, and means for swinging said clincher members on their pivots in timed relation to the actuation of said anvils to clinch the ends of the prongs on the outside of the work and while supported by said anvils.

5. In a machine of the class described, the combination of a reciprocating head, a work table, pivotally mounted anvils having curved grooves in their faces, a hammer carried by said head, a prong forming member operatively associated with said hammer and head for limited movement independently of the hammer, means for actuating said forming member, means for actuating said anvils on their pivots in timed relation to the actuation of said hammer and so that the handle prongs are bent and their ends directed outwardly through the work, clinching members pivotally mounted on said head, and means for swinging said clincher members on their pivots on the work stroke of the head and in timed relation to the actuation of the hammer and anvils to clinch the ends of the prongs on the outside of the work and while supported by said anvils.

6. In a machine of the class described, the combination of a reciprocating head, a work table, pivotally mounted anvils having curved grooves in their faces, a hammer carried by said head, means for actuating said anvils on their pivots in timed relation to the actuation of said hammer and so that the handle prongs are bent and their ends directed outwardly through the work, clinching members pivotally mounted on said head, and means for swinging said clincher members on their pivots on the work stroke of the head 7. In a machine of the class described, the combination of a reciprocating head, a work table, pivotally mounted anvils having curved grooves in their faces, a hammer carried by said head, a prong forming member operatively associated with said hammer and head for limited movement independently of the hammer, means for actuating said forming member, means for actuating said anvils on their pivots in timed relation to the actuation of said hammer and so that the handle prongs are bent and their ends directed outwardly through the work, clinching members pivotally mounted on said head, and means for swinging said clincher members on their pivots on the work stroke of the head and in timed relation to the actuation of the hammer and anvils.

8. In a machine of the class described, the combination of a reciprocating head, a work table, pivotally mounted anvils having curved grooves in their faces, a hammer carried by said head, means for actuating said anvils on their pivots in timed relation to the actuation of said hammer and so that the handle prongs are bent and their ends directed outwardly through the work, clinching members pivotally mounted on said head, and means for swinging said clincher members on their pivots on the work stroke of the head and in timed relation to the actuation of the hammer and anvils.

9. In a machine of the class described, the combination of a work table, anvils having curved grooves in their faces pivotally mounted in operative relation to said work table, a hammer, a prong forming means for forming laterally disposed prongs on a U-shaped handle element, said forming means acting to support the prongs as they are driven by the hammer inwardly through the work and into engagement with said anvils, means for actuating said anvils in timed relation to the actuation of said hammer and so that the prongs are bent and their ends directed outwardly through the work, and clinching members having a combined swinging and reciprocating movement actuated in timed relation to the actuation of the hammer and anvils to clinch the ends of the prongs upon the outer side of the work and while the hammer and anvils are in supporting engagement therewith.

10. In a machine of the class described, the combination of a work table, anvils having curved grooves in their faces pivotally mounted in operative relation to said work table, a hammer, a prong forming means for forming laterally disposed prongs on a U shaped handle element, said forming means acting to support the prongs as they are driven by the hammer inwardly through the work and into engagement with said anvils, means for actuating said anvils in timed relation to the actuation of said hammer and so that the prongs are bent and their ends directed outwardly through the work, and clinching members actuated in timed relation to the actuation of the hammer and anvils to clinch the ends of the prongs upon the outer side of the work and while the hammer and anvils are in supporting engagement therewith.

11. In a machine of the class described, the combination of a work table, anvils mounted in operative relation to said work table, a hammer, a prong forming means for forming laterally disposed prongs on a U-shaped handle element, said forming means acting to support the prongs as they are driven by the hammer inwardly through the work and into engagement with said anvils, means for actuating said anvils in timed relation to the actuation of said hammer and so that the prongs are bent and their ends directed outwardly through the work, and clinching members having a combined swinging and reciprocating movement actuated in timed relation to the actuation of the hammer, to clinch the ends of the prongs upon the outer side of the work.

12. In a machine of the class described, the combination of a work table, anvils mounted in operative relation to said work table, a hammer, a prong forming means for forming laterally disposed prongs on a U shaped handle element, said forming means acting to support the prongs as they are driven by the hammer inwardly through the work and into engagement with said anvils, means for actuating said anvils in timed relation to the actuation of said hammer and so that the prongs are bent and their ends directed outwardly through the work, and clinching members actuated in timed relation to the actuation of the hammer to clinch the ends of the prongs upon the outer side of the work.

13. In a machine of the class described, the combination of a work table, anvils having curved grooves in their faces pivotally mounted in operative relation to said work table, a hammer acting to drive laterally disposed prongs on a handle inwardly through the work and into engagement with said anvils, means for actuating said anvils in timed relation to the actuation of said hammer and so that the prongs are bent and their ends directed outwardly through the work, and clinching members having a combined swinging and reciprocating movement actuated in timed relation to the actuation of the hammer and anvils to clinch the ends of the prongs upon the outer side of the work and while the hammer and anvils are in supporting engagement therewith.

14. In a machine of the class described, the combination of a work table, anvils having curved grooves in their faces pivotally mounted in operative relation to said work table, a hammer acting to drive laterally disposed prongs on a handle inwardly through the work and into engagement with said anvils, means for actuating said anvils in timed relation to the actuation of said hammer and so that the prongs are bent and their ends directed outwardly through the work, and clinching members actuated in timed relation to the actuation of the hammer and anvils to clinch the ends of the prongs upon the outer side of the work and while the hammer and anvils are in supporting engagement therewith.

15. In a machine of the class described, the combination of a work table, anvils mounted in operative relation to said work table, a hammer acting to drive laterally disposed prongs on a handle inwardly through the work and into engagement with said anvils, means for actuating said anvils in timed relation to the actuation of said hammer and so that the prongs are bent and their ends directed outwardly through the work, and clinching members having a combined swinging and reciprocating movement actuated in timed relation to the actuation of the hammer to clinch the ends of the prongs upon the outer side of the work.

16. In a machine of the class described, the combination of a work table, anvils mounted in operative relation to said work table, a hammer acting to drive laterally disposed prongs on a handle inwardly through the work and into engagement with said anvils, means for actuating said anvils in timed relation to the actuation of said hammer and so that the prongs are bent and their ends directed outwardly through the work, and clinching members actuated in timed relation to the actuation of the hammer to clinch the ends of the prongs upon the outer side of the work.

17. In a machine of the class described, the combination of a tiltingly mounted anvil having a curved groove in its face, a hammer, means for actuating said anvil in timed relation to the actuation of said hammer, and a clinching member having a combined swinging and reciprocating movement actuated in timed relation to the actuation of the hammer and anvil to act while the hammer and anvil are in supporting engagement with the work.

18. In a machine of the class described, the combination of an anvil having a curved groove in its face, a hammer, and a clinching member having a combined swinging and reciprocating movement actuated in timed relation to the actuation of the hammer.

19. In a machine of the class described, the combination of a tiltingly mounted anvil, a hammer, means for actuating said anvil in timed relation to the actuation of said hammer, and a clinching member having a combined swinging and reciprocating movement actuated in timed relation to the actuation of the hammer and anvil.

20. In a machine of the class described, the combination of a tiltingly mounted anvil, a hammer, means for actuating said anvil in timed relation to the actuation of said hammer, and a clinching member actuated in timed relation to the actuation of the hammer and anvil.

21. The combination in a machine for making and applying handles, including means for forming wire into a U shaped handle unit with laterally directed prongs, of a hammer, anvils operatively associated with said hammer and acting to bend the prongs as they are driven through the work and direct them outwardly through the work, and clinching members actuated in timed relation to the actuation of said hammer to clinch the ends of the prongs upon the outer side of the work.

22. In a machine for applying handles, the combination of a hammer, anvils operatively associated with said hammer and acting to bend the prongs as they are driven through the work and direct them outwardly through the work, and clinching members actuated in timed relation to the actuation of said hammer to clinch the ends of the prongs upon the outer side of the work.

In witness whereof I have hereunto set my hand.

CARL O. STROMBECK.